United States Patent
Donovan (10) Patent No.: US 9,081,681 B1
(45) Date of Patent: Jul. 14, 2015

(54) METHOD AND SYSTEM FOR IMPLEMENTING COMPRESSED NORMAL MAPS

(75) Inventor: Walter E. Donovan, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 86 days.

(21) Appl. No.: 10/742,434

(22) Filed: Dec. 19, 2003

(51) Int. Cl.
*G09G 5/00* (2006.01)
*G06T 11/40* (2006.01)
*G06T 9/00* (2006.01)
*G06F 12/08* (2006.01)

(52) U.S. Cl.
CPC ........................................ *G06F 12/08* (2013.01)

(58) Field of Classification Search
USPC ......... 345/584, 582, 581, 418, 585, 543, 544, 345/555, 565, 564, 572, 530, 552
See application file for complete search history.

(56) References Cited

U.S. PATENT DOCUMENTS

| | | | |
|---|---|---|---|
| 4,791,403 A | 12/1988 | Mitchell et al. | |
| 4,803,477 A * | 2/1989 | Miyatake et al. | 345/565 |
| 5,109,417 A | 4/1992 | Fielder et al. | |
| 5,227,789 A | 7/1993 | Barry et al. | |
| 5,495,542 A | 2/1996 | Shimomura et al. | |
| 5,495,545 A | 2/1996 | Shimomura et al. | |
| 5,644,524 A | 7/1997 | Van Aken et al. | |
| 5,736,987 A * | 4/1998 | Drucker et al. | 345/420 |
| 5,793,371 A * | 8/1998 | Deering | 345/418 |
| 5,801,708 A | 9/1998 | Alcorn et al. | |
| 5,801,975 A | 9/1998 | Thayer et al. | |
| 5,831,640 A | 11/1998 | Wang et al. | |
| 5,835,097 A | 11/1998 | Vaswani et al. | |
| 5,841,442 A | 11/1998 | Einkauf et al. | |
| 5,963,744 A | 10/1999 | Slavenburg et al. | |
| 6,052,127 A | 4/2000 | Vaswani et al. | |
| 6,055,000 A | 4/2000 | Okada | |
| 6,078,334 A * | 6/2000 | Hanaoka et al. | 345/584 |
| 6,184,893 B1 | 2/2001 | Devic et al. | |
| 6,433,789 B1 | 8/2002 | Rosman | |
| 6,501,851 B1 | 12/2002 | Kondo et al. | |
| 6,546,409 B1 | 4/2003 | Wong | |
| 6,580,828 B1 | 6/2003 | Li | |
| 6,700,581 B2 | 3/2004 | Baldwin et al. | |
| 6,876,362 B1 | 4/2005 | Newhall, Jr. et al. | |
| 7,109,999 B1 | 9/2006 | Lindholm et al. | |
| 7,126,604 B1 | 10/2006 | Purcell et al. | |
| 7,224,838 B2 | 5/2007 | Kondo et al. | |
| 7,916,149 B1 | 3/2011 | Donovan et al. | |
| 8,078,656 B1 | 12/2011 | Rogers et al. | |
| 2002/0147753 A1 | 10/2002 | Rao et al. | |
| 2003/0023646 A1 | 1/2003 | Lin et al. | |

(Continued)

OTHER PUBLICATIONS

Mark Adler, Gzappend, Nov. 4 2003, http://svn.ghostscript.com/ghostscript/tags/zlib-1.2.3/examples/gzappend.-c.

*Primary Examiner* — Joni Hsu (57) ABSTRACT

A method for compressing normal maps in a computer system. The method includes accessing a map of input normals. A memory block having a first portion and a second portion is defined. A table of indices is stored in the first portion of the memory block and a table of normals is stored in the second portion of the memory block. The indices of the first portion of the memory block reference the normals of the second portion. The normals in the second portion of the memory block are unit normals of a sphere defined to represent the map of input normals.

23 Claims, 6 Drawing Sheets

(56) References Cited

U.S. PATENT DOCUMENTS

| | | |
|---|---|---|
| 2003/0105788 A1 | 6/2003 | Chatterjee |
| 2003/0169265 A1 | 9/2003 | Emberling |
| 2003/0206177 A1 | 11/2003 | Hoppe et al. |
| 2003/0223490 A1 | 12/2003 | Kondo et al. |
| 2004/0027358 A1 | 2/2004 | Nakao |
| 2004/0151372 A1 | 8/2004 | Reshetov et al. |
| 2004/0207631 A1* | 10/2004 | Fenney et al. ............ 345/584 |
| 2005/0110790 A1* | 5/2005 | D'Amora .................. 345/419 |

* cited by examiner

METHOD AND SYSTEM FOR IMPLEMENTING COMPRESSED NORMAL MAPS

FIELD OF THE INVENTION

The field of the present invention relates to computer graphics. More particularly, the present invention relates to rendering operations in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions.

With the early graphic systems, textures on surfaces consisted of color information only. For example, the texture would be a picture of whatever material the designer was trying to convey (e.g., brick, stone, vegetation, wood, etc.) and would contain shading information as well as the texture and color to create the impression of a complex, dimensional surface. In more recent graphic systems, a light map is often combined with the color map to create a more realistic sense of shading and soft shadowing. The trouble with this technique is that the shading on a particular texture would often be at variance with the perceived sources of light in the scene in which they were used. For example, a texture might be drawn as if it were lit from the upper left, but in a particular scene, the actual light source may be from the right, or below the texture.

To overcome these limitations, a new technique was developed, generically called "bump mapping". In its simplest form, a texture on a surface contains two textures, for example, a color map and a second map that contains the height information for the surface. This information enables the rendering of highlights and shadows on the surface according to where the lights in the scene are located, resulting in a vastly improved surface realism. The problem with prior art bump mapping techniques is the fact that the graphic system is restricted to portraying transitions in elevation only, resulting in a flattened appearance of the actual height information the designer is trying to convey.

Normal maps were developed to overcome the limitations of bump mapping. While a height map only contains 1 component of information (e.g., the "Z" height or direction), the vectors of a normal map contains 3 components of information (e.g., "X" direction, "Y" direction and "Z" direction). Thus, each pixel in a normal map encodes which direction that particular point is facing (e.g., the "normal vector" of the surface). Each pixel in a normal map has meaningful information, so details can be rendered more crisply than with bump maps alone.

The problem with real-time rendering using normal maps is that there is an excessively large amount of data to manipulate for each rendered frame. For example, normal maps typically use three channels of information in their coding, mapped to a standard RGB image. Generally, for each pixel, the red channel can be used to encode normal vectors in the X direction. Similarly, the green channel encodes normal vectors in the Y direction, and the blue channel encodes normal vectors in the Z direction, or the like.

To improve the performance of real-time rendering graphics systems, several prior art normal map compression schemes have been developed. The objective of these prior art compression schemes is to compress normal maps (e.g., texture maps where each pixel is a normalized vector) so that their storage consumes less space and their processing consumes less bandwidth.

One prior art compression scheme uses a hemispherical normal map data structure, where 16 bits per pixel were used to represent any point on a hemisphere. In a typical case, 65,536 points on the surface of the hemisphere would each be described by a respective 16 bits. Thus, the normal for any point on the surface would be described by selecting its corresponding normal, or point, on the hemisphere data structure. A significant degree of compression can be obtained with this prior art compression scheme. The compression results in some degree of quantization loss.

The problem with this prior art compression scheme, however, is that there still remains a very large amount of data that must be manipulated and processed in real-time. This large amount of data still presents a significant burden on even the most modern graphics rendering pipelines.

SUMMARY OF THE INVENTION

Embodiments of the present invention provide a method and system for implementing compressed normal maps. Embodiments of the present invention significantly reduce the amount of data that must be manipulated and processed in real-time. Embodiments of the present invention provide an improved normal map compression ratio in comparison to the prior art, thereby significantly reducing the processor and storage burden on graphics rendering pipelines.

In one embodiment, the present invention is implemented as a GPU (graphics processor unit) based method for compressing normal maps in a computer system. The method includes accessing a map of input normals. A memory block having a first portion and a second portion is defined. A table of indices is stored in the first portion of the memory block and a table of normals is stored in the second portion of the memory block. The indices of the first portion of the memory block reference the normals of the second portion. The normals in the second portion of the memory block are unit normals of a sphere defined to represent the map of input normals.

In one embodiment, the memory block is a 64-byte memory block having a first 256-bit portion and a second 256-bit portion for storing a first table of 64 4-bit indices and a second table of 16 entries, wherein each entry comprises a 16 bit encoded normal. In one embodiment, 16 optimally selected normals in the second table are used to represent 64 input normals.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for implementing compressed normal maps. Embodiments of the present invention significantly reduce the amount of data that must be manipulated and processed in real-time. Embodiments of the present invention provide an improved normal map compression ratio in comparison to the prior art, thereby significantly reducing the processor and storage burden on graphics rendering pipelines. Embodiments of the present invention and their benefits are further described below.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "compressing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

Figure 1:
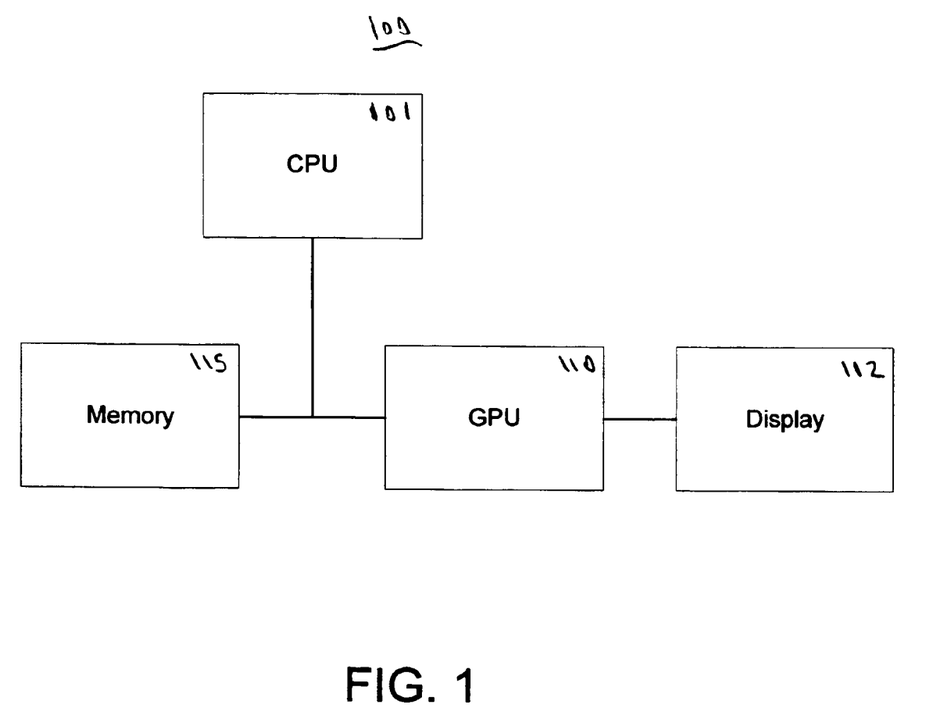
FIG. 1 shows a computer system in accordance with one embodiment of the present invention.

With reference now to FIG. 1, a computer system 100 in accordance with one embodiment of the present invention is shown. Computer system 100 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within non-transitory computer readable storage media units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and a graphics processor unit (GPU) 110 via one or more busses as shown. The GPU 110 is coupled to a display 112. As shown in FIG. 1, system 100 shows the basic components of a computer system platform that implements the functionality of the present invention. Accordingly, system 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, 10 devices, and the like.

Additionally, it should be appreciated that although the GPU 110 is depicted in FIG. 1 as a discrete component, the GPU 110 can be implemented as a discrete graphics card designed to couple to the computer system via a graphics port (e.g., AGP port, or the like), as a discrete integrated circuit die (e.g., mounted directly on the motherboard), or as an integrated GPU included within the integrated circuit die of a computer system chipset (e.g., integrated within the Northbridge chip). Similarly, system 100 can be implemented as a set-top video game console device such as, for example, the Xbox®, available from Microsoft Corporation of Redmond Wash.

Figure 2:
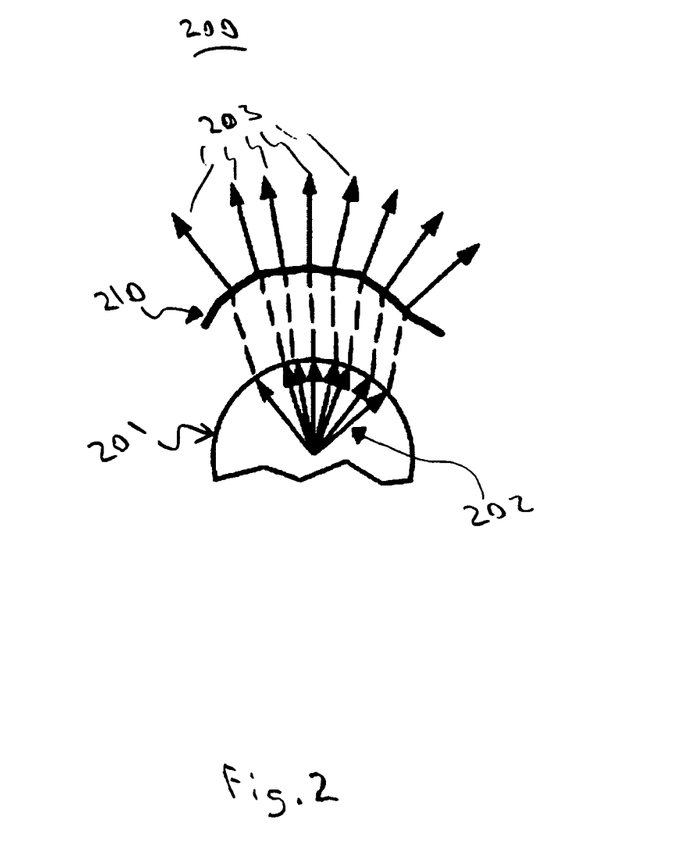
FIG. 2 shows a diagram illustrating the operation of a normal map compression method in accordance with one embodiment of the present invention.

FIG. 2 shows a diagram 200 illustrating the operation of a normal map compression method in accordance with one embodiment of the present invention. As depicted in FIG. 2, a portion of a unit sphere 201 is shown. Within the sphere 201, a plurality of 3D normal vectors 202 are shown. As known by those skilled in the art, these vectors 202 are unit vectors and represent the normal vectors 203 of the surface 210.

Thus, the normals 202 can provide a normal map that describes the orientation of the surface 210. For example, in the same manner as a texture map can give a color at every point on the surface 210, a normal map can give a normal orientation at every point on the surface 210. Once applied to the surface 210, the resulting normals 203 enabled the rendering of very realistic lighting effects.

Figure 3:
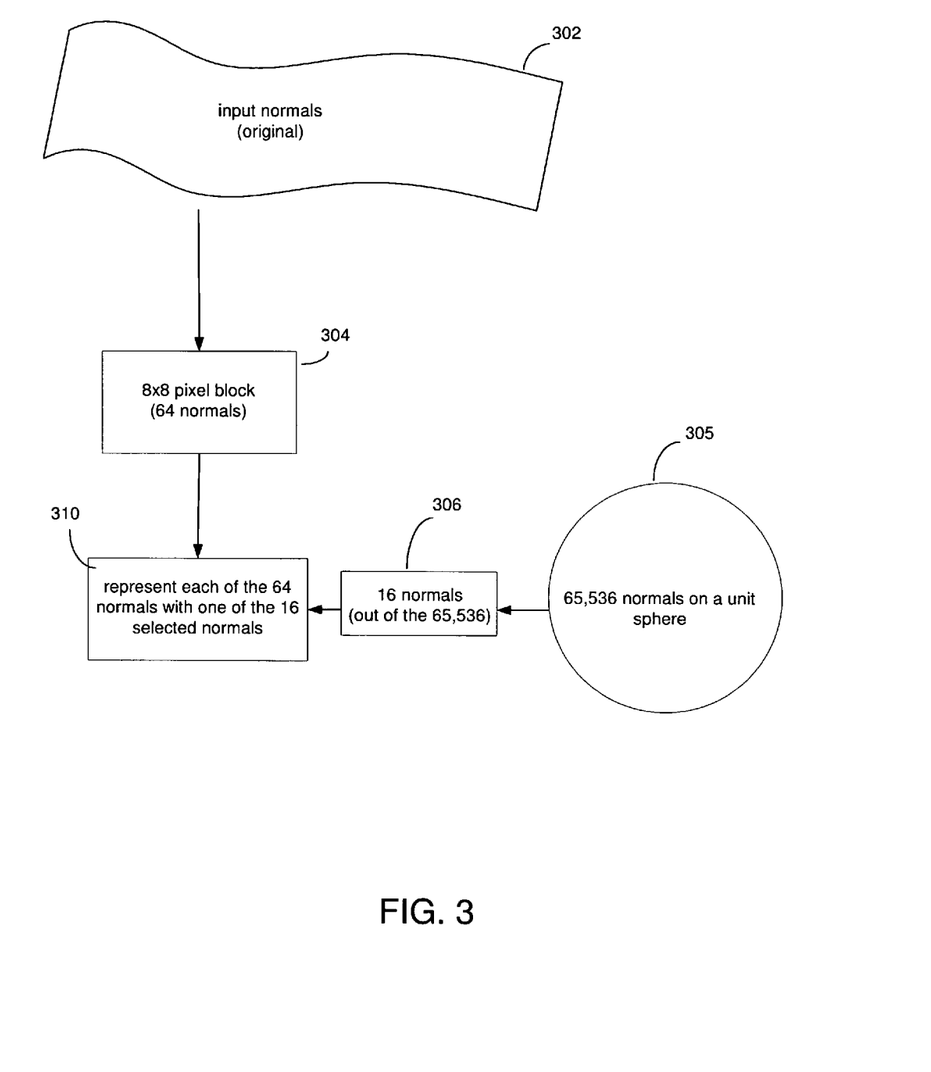
FIG. 3 shows a flow diagram depicting the compression ratios provided by embodiments of the present invention.

FIG. 3 shows a flow diagram depicting the compression ratios provided by embodiments of the present invention. In the flow diagram of FIG. 3, the input normals 302 comprise a normal map describing the normals on a 3-D modeled surface (e.g., the original normals). As described above, these original normals describe the direction that their particular points on the 3-D modeled surface are facing (e.g., the "normal vector" of the surface). In the present embodiment, these original normals are examined by a compression process 310 in successive blocks (e.g., block 304) of eight-by-eight (8×8) pixels.

As shown in the FIG. 3 flow diagram, out of a unit sphere 305 having 65,536 possible normals, 16 normals 306 are selected that most optimally represent the 64 normals of the 8×8 block 304. Thus, the objective is to compress the 64 normals of the 8×8 block 304. In the compression process 310, the 64 normals from each 8×8 block 304 are each represented by one of the selected 16 normals 306.

Embodiments of the present invention function by choosing the most optimal 16 normals 306 from the 65,536 points on the quantized sphere 305 to represent these 64 original normals of the block 304. In other words, the compression process 310 reduces the 64 original normals to 16 quantized sphere normals that most optimally represent these original normals.

It should be noted that the also note that the meaning of term "most optimally represent" is generally application dependent. For example, in one application, it may be most optimal to minimize the average angular deviation of the selected normals 306 with respect to the original normals 304. In other words, an examination is made as to the degree to which each of the original normals 304 has had to deviate (e.g., how far it has had to move on the sphere 305) and the selected normals 306 are chosen in such a manner as to minimize the mean deviation.

In another application, one may wish to minimize the average error of the dot product of the quantized normal with several possible light vectors compared to the dot product of the original normal and the same set of light vectors.

Figure 4:
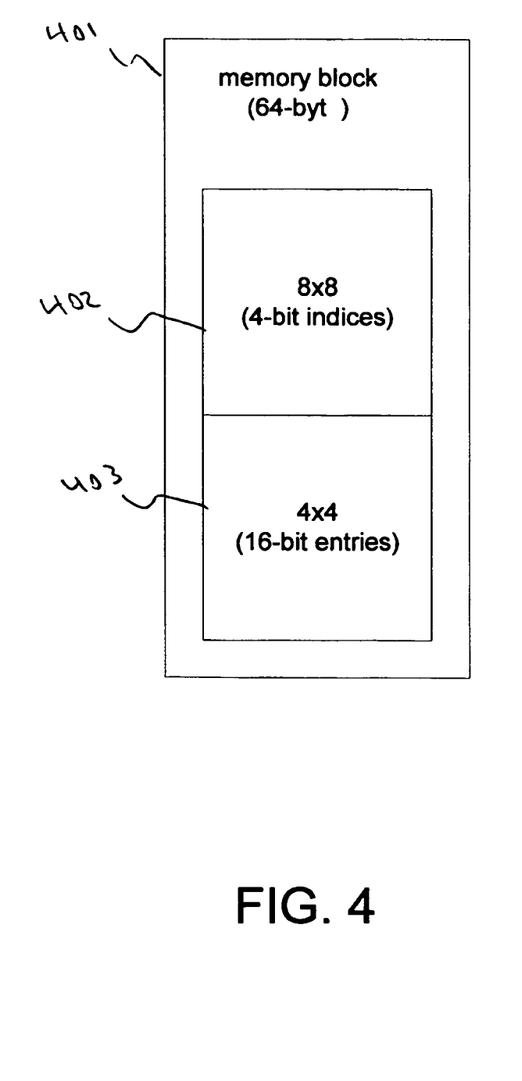
FIG. 4 shows a memory block in accordance with one embodiment of the present invention.

FIG. 4 shows a memory block 401 in accordance with one embodiment of the present invention. In one embodiment, the memory block 401 comprises a 64-byte memory block having a first 256-bit portion 402 and a second 256-bit portion 403.

In one embodiment, a table of indices is stored in the first portion 402 of the memory block 401 and a table of normals is stored in the second portion 403 of the memory block 401. The indices of the first portion 402 of the memory block 401 reference the normals of the second portion 403. The normals in the second portion 403 of the memory block 401 are unit normals of a sphere (e.g., sphere 305 of FIG. 3) defined to represent the map of input normals (e.g., input normals 302 of FIG. 3).

In one embodiment, the first portion 402 stores a first table of 64 4-bit indices and the second portion 403 stores a second table of 16 entries, wherein each entry comprises a 16 bit encoded normal. In one embodiment, 16 optimally selected normals in the second table 403 are used to represent 64 input normals (e.g., block of input normals 304). The resulting 64 input normals are thus compressed and stored using only 8 bits/pixel.

It should be noted that the compression method of the present embodiment results in both a quantization loss (e.g., fewer bits per normal) and selection loss (e.g., fewer normals). This is due to the fact that a compression algorithm must down-select the most optimal resulting normals from the 65,536 normals on the unit sphere. For example, in the scenario described above in FIG. 3, the 16 best normals 306 (e.g., from the unit sphere 305) must be selected to represent 64 input normals 304.

Figure 5:
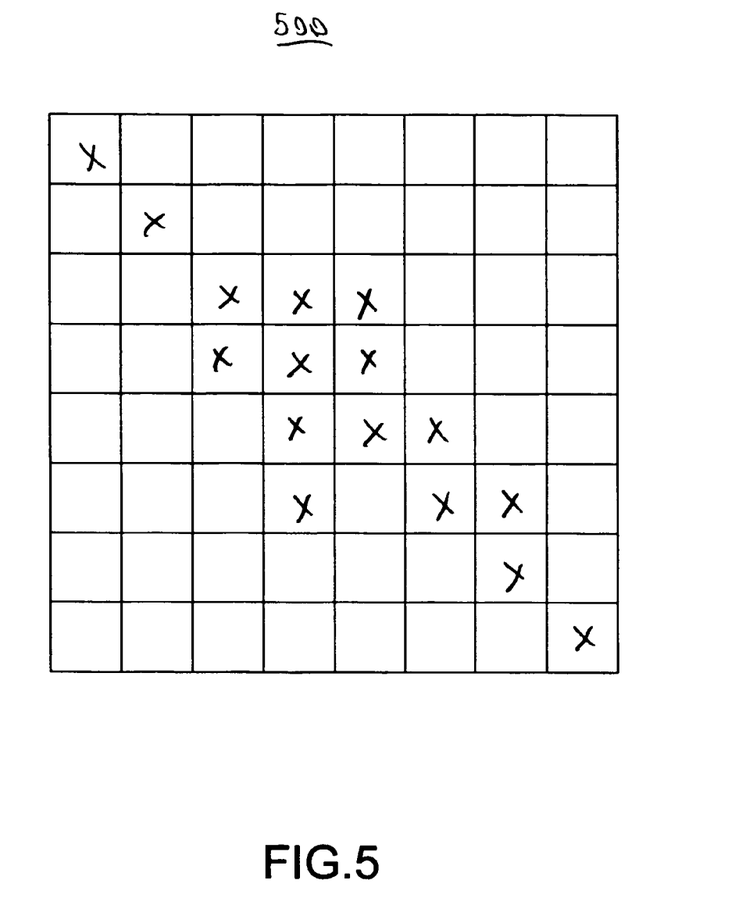
FIG. 5 shows a distribution of the 16 output normals in accordance with one embodiment of the present invention.

FIG. 5 shows an example distribution of the 16 selected normals (e.g., the output normals) in accordance with one embodiment of the present invention. As described in the scenario above, the 16 best normals must be selected to represent 64 input normals. However, it should be noted that embodiments of the present invention are not limited to a uniform distribution of the resulting output normals. These normals can be clustered around more significant, or more interesting, areas of the unit sphere 305. This is depicted in FIG. 5 as a two dimensional map 500 of the 64 input normals. An "x" within a square represents one of the 16 normals selected by the algorithm. As can be seen in FIG. 5, the 16 output normals can be clustered non-uniformly within the 64 input normal values.

It should also be noted that embodiments of the present invention are suited to different encoding mechanisms for the resulting 16 output normals. In the example described above, 16 bits represent each output normal. Embodiments of the present invention can encode the 16 bits in a number of different ways. For example, in one embodiment, 8 bits can be used for "x", 7 bits can be used for "y", and 1 bit can be used for "z". Alternatively, 6 bits can be used for "x", 5 bits can be used for "y", and 5 bits can be used for "z". For example, in one embodiment, a logic block (e.g., within the GPU) is specifically adapted to convert the 16 bit representation to a 3 component vector (X,Y,Z) representing that same point on a sphere. This vector is directly usable by graphics hardware (e.g., a GPU shader), whereas the original 16 bit representation is not. It should be noted that other representations (e.g., 12 bit, 24 bit, etc.) can be implemented while remaining within the scope of the present invention.

Figure 6:
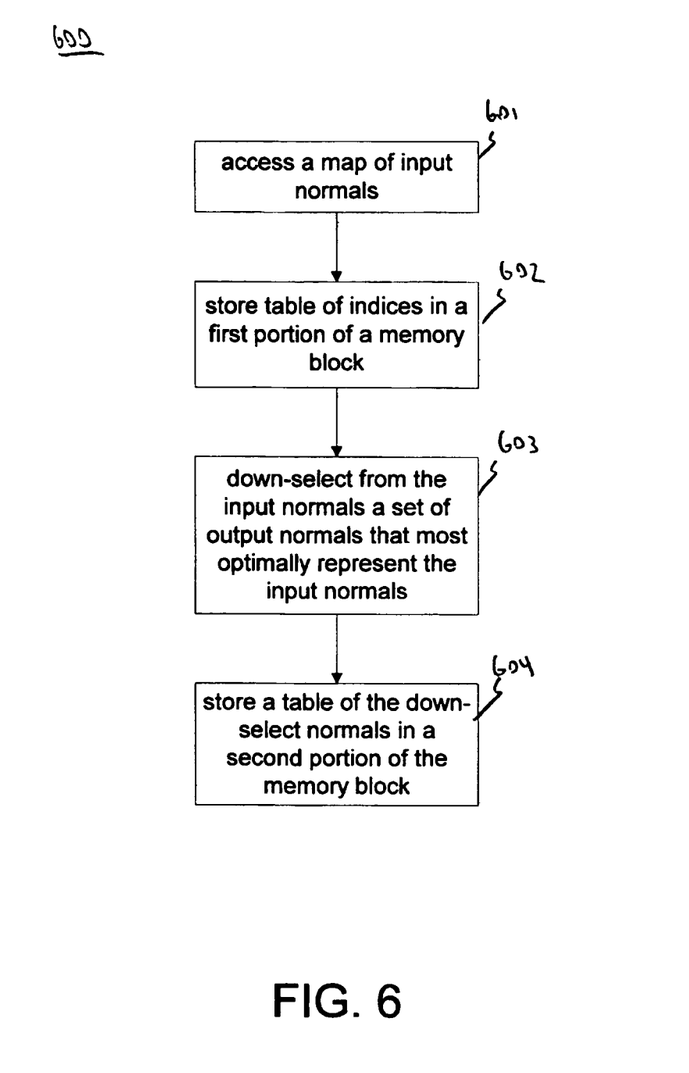
FIG. 6 shows a flowchart of the steps of a process in accordance with one embodiment of the present invention.

FIG. 6 shows a flowchart of the steps of a process 600 in accordance with one embodiment of the present invention. As depicted in FIG. 6, process 600 shows the operating steps of a method for compressing normal maps in a computer system (e.g., computer system 100 of FIG. 1).

Process 600 begins in step 601, where a normal map of input normals (e.g., input normals 302 of FIG. 3) is accessed. In step 602, a table of indices (e.g., table 402 of FIG. 4) is stored in a first portion of a memory block. In step 603, a set of output normals (e.g., the selected normals 306) is down-selected from the normals defined by a unit sphere (e.g., the 65,536 normals of the unit sphere 305). As described above, an algorithm is used in order to select the output normals that best represent the input normals. In step 604, a table of the down-selected output normals is stored in a second portion of the memory block (e.g., portion 403).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for compressing normal maps in a computer system, comprising:

accessing a map of input normals, said map of input normals comprising a plurality of normal vectors on a surface of an image;

defining a memory block having a first portion and a second portion;

storing a table of indices in the first portion of the memory block; and storing a table of normals in the second portion of the memory block, the normals in the second portion of the memory block comprising a subset of normals out of a set of unit normals of a quantized unit sphere, wherein the indices of the first portion of the memory block reference the normals of the second portion of the memory block, wherein the quantized unit sphere is quantized into points and the subset of normals is derived from a subset of the points selected to represent the map of input normals, further wherein the subset of the normals stored in the second portion of the memory block is selected by applying a compression algorithm to the set of unit normals of the quantized unit sphere according to a pre-defined metric for manipulating an average value corresponding to the unit normals.

2. The method of claim 1, wherein the memory block is a 64-byte memory block.

3. The method of claim 2, wherein the first portion is 256 bits and the second portion is 256 bits.

4. The method of claim 1, wherein the first portion of the memory block comprises a first table of 64 4-bit indices.

5. The method of claim 1, wherein the second portion of the memory block comprises a second table of 16 entries, and wherein each entry comprises a 16 bit encoded normal.

6. The method of claim 1, wherein 16 selected normals in the second portion are used to represent 64 input normals.

7. The method of claim 1, wherein the pre-defined metric for manipulating an average value corresponding to the unit normals comprises a metric to minimize the average angular deviation of the unit normals of the set of unit normals of the quantized unit sphere.

8. The method of claim 1, wherein the pre-defined metric for manipulating an average value corresponding to the unit normals comprises a metric to minimize the average error of the dot product of the unit normals of the set of unit normals of the quantized unit sphere.

9. A system for compressing normal maps in a graphics computer system, the system having a graphics processor unit (GPU) coupled to a memory, the memory having computer readable code which when executed by the GPU cause the GPU to implement a method comprising:

accessing a map of input normals, said map of input normals comprising a plurality of normal vectors on a surface of an image;

defining a memory block having a first portion and a second portion;

storing a table of indices in the first portion of the memory block; and storing a table of normals in the second portion of the memory block, the normals in the second portion of the memory block comprising a subset of normals out of a set of unit normals of a quantized unit sphere, wherein the indices of the first portion of the memory block reference the normals of the second portion of the memory block, wherein the quantized unit sphere is quantized into points and the subset of normals is derived from a subset of the points selected to represent the map of input normals, further wherein the subset of the normals stored in the second portion of the memory block is selected by applying a compression algorithm to the set of unit normals of the quantized unit sphere according to a pre-defined metric for manipulating an average value corresponding to the unit normals.

10. The system of claim 9, wherein the memory block is a 64-byte memory block.

11. The system of claim 10, wherein the first portion is 256 bits and the second portion is 256 bits.

12. The system of claim 9, wherein the first portion of the memory block comprises a first table of 64 4-bit indices.

13. The system of claim 9, wherein the second portion of the memory block comprises a second table of 16 entries, and wherein each entry comprises a 16 bit encoded normal.

14. The system of claim 9, wherein 16 selected normals in the second portion are used to represent 64 input normals.

15. The system of claim 9, wherein the pre-defined metric for manipulating an average value corresponding to the unit normals comprises a metric to minimize the average angular deviation of the unit normals of the set of unit normals of the quantized unit sphere.

16. The system of claim 9, wherein the pre-defined metric for manipulating an average value corresponding to the unit normals comprises a metric to minimize the average error of the dot product of the unit normals of the set of unit normals of the quantized unit sphere.

17. A non-transitory computer readable storage media having computer readable code, which when executed by a processor of a computer system cause the computer system to implement a method for compressing normal maps, comprising:

accessing a map of input normals, said map of input normals comprising a plurality of normal vectors on a surface of an image;

defining a 64-byte memory block having a first 256-bit portion and a second 256-bit portion;

storing a first table of 64 4-bit indices in the first portion of the memory block; and storing a second table of 16 entries in the second portion of the memory block, wherein each entry comprises a 16 bit encoded normal, wherein the indices of the first table reference the normals of the second table, the normals in the second table comprising a subset of a greater number of unit normals of a quantized unit sphere, wherein the quantized unit sphere is quantized into points and the subset of normals is derived from a subset of the points selected to represent the map of input normals, further wherein the subset of the normals stored in the second portion of the memory block is selected by applying a compression algorithm to the set of unit normals of the quantized unit sphere according to a pre-defined metric for manipulating an average value corresponding to the unit normals.

18. The non-transitory computer readable storage media of claim 17, wherein the first table comprises and 8×8 table of 4-bit indices.

19. The non-transitory computer readable storage media of claim 17, wherein the second table comprises a 4×4 table of 16 entries.

20. The non-transitory computer readable storage media of claim 17, wherein 16 selected normals in the second table are used to represent 64 input normals.

21. The non-transitory computer readable storage media of claim 20, wherein the 64 input normals are used to represent a plurality of possible unit normal vectors over a hemisphere.

22. The non-transitory computer readable storage media of claim 17, wherein the pre-defined metric for manipulating an average value correspond to the unit normals comprises a metric to minimize the average angular deviation of the unit normals of the set of unit normals of the quantized unit sphere.

23. The non-transitory computer readable storage media of claim 17, wherein the pre-defined metric for manipulating an average value corresponding to the unit normals comprises a metric to minimize the average error of the dot product of the unit normals of the set of unit normals of the quantized unit sphere.

\* \* \* \* \*